United States Patent [19]

Solomon et al.

[11] Patent Number: 4,945,864
[45] Date of Patent: Aug. 7, 1990

[54] TWO CYCLE ENGINE PISTON LUBRICATION

[75] Inventors: James G. Solomon, Grosse Pointe Woods; Chester J. Rivard, Sterling Heights, both of Mich.

[73] Assignee: General Motors Corporation, Detroit, Mich.

[21] Appl. No.: 369,224

[22] Filed: Jun. 21, 1989

[51] Int. Cl.$^5$ .............................................. F01P 1/04
[52] U.S. Cl. ............................. 123/41.39; 123/193 P; 92/159
[58] Field of Search ............. 123/196 R, 41.39, 41.35, 123/41.37, 41.38, 196 M, 193 P; 92/159

[56] References Cited

U.S. PATENT DOCUMENTS

| | | | |
|---|---|---|---|
| 1,916,978 | 7/1933 | Harper, Jr. | 92/159 |
| 2,967,516 | 1/1961 | Stumptig | 123/41.39 |
| 3,494,262 | 2/1970 | Holcombe | 92/159 |
| 4,280,455 | 7/1981 | Yamaguchi et al. | 123/196 M |
| 4,363,310 | 12/1982 | Thurston | 92/159 |
| 4,608,947 | 9/1986 | Stadler | 92/159 |
| 4,794,896 | 1/1989 | Tsai et al. | 123/41.39 |

FOREIGN PATENT DOCUMENTS 637183  2/1962  Canada ............................ 123/41.39

OTHER PUBLICATIONS

Detroit Diesel V-71-Engine Manual, Section 1.6, p. 1, Piston and Piston Rings, General Motors Corporation, Feb., 1982.

*Primary Examiner*—E. Rollins Cross
*Attorney, Agent, or Firm*—Robert J. Outland

[57] ABSTRACT

A two cycle engine has oil distribution means through the cylinder wall to feed internal oil passages in the associated piston that distribute oil directly to the skirt and cylinder walls, preferably between ports, and/or to the wrist pin and connecting rod bearing to thereby limit oil carryover into the engine charging and scavenging air.

4 Claims, 3 Drawing Sheets

4,945,864

TWO CYCLE ENGINE PISTON LUBRICATION

TECHNICAL FIELD

This invention relates to crankcase scavenged two-stroke cycle engines, commonly called and referred to hereinafter as two cycle engines, and to means for lubricating the pistons, cylinders and wrist pin bearings therein.

BACKGROUND

It is known in the art relating to crankcase scavenged two cycle engines that cylinder and wrist pin lubrication may be accomplished by mixing lubricating oil with the air drawn into the engine crankcase, compressed and forced into the cylinder for scavenging and charging the cylinder. The lubricating oil lubricates the cylinder walls and pistons as well as the crankshaft and wrist pin bearings and much of it is subsequently burned along with the fuel in the engine cylinder.

However, the unburned oil adds significantly to unburned hydrocarbons (HC) in the engine exhaust and makes difficult the use of such an engine for emission controlled automotive vehicles. Pressure scavenging with a pump separate from the crankcase can allow the use of conventional wet sump oil storage and pressure distribution and largely avoid the problem of oil carry-over into the cylinder but crankcase scavenging is thought to have advantages in simplicity and performance which make its use desirable. An alternative means for lubrication of the bearings and cylinders is therefore desired.

SUMMARY OF THE INVENTION

The present invention provides means for lubricating the pistons of an engine both as to their reciprocating motion within the cylinders and the internal wrist pin connections with the associated connecting rods. The means are preferably used in two cycle engines having crankcase scavenging but could also be applied to other engine embodiments.

Internal passages within each piston are provided to conduct oil to the cylinder wall, the wrist pin and/or the connecting rod pin bearing. The piston passages, or oil passage means, open through the piston side wall or skirt to intermittently communicate with oil feed passages in the engine, opening through the cylinder wall. The passages are located in parts of the cylinder and piston that have no ports disposed in the path of the vertical travel of those parts of the piston so that lubricating oil loss to the ports is minimized.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
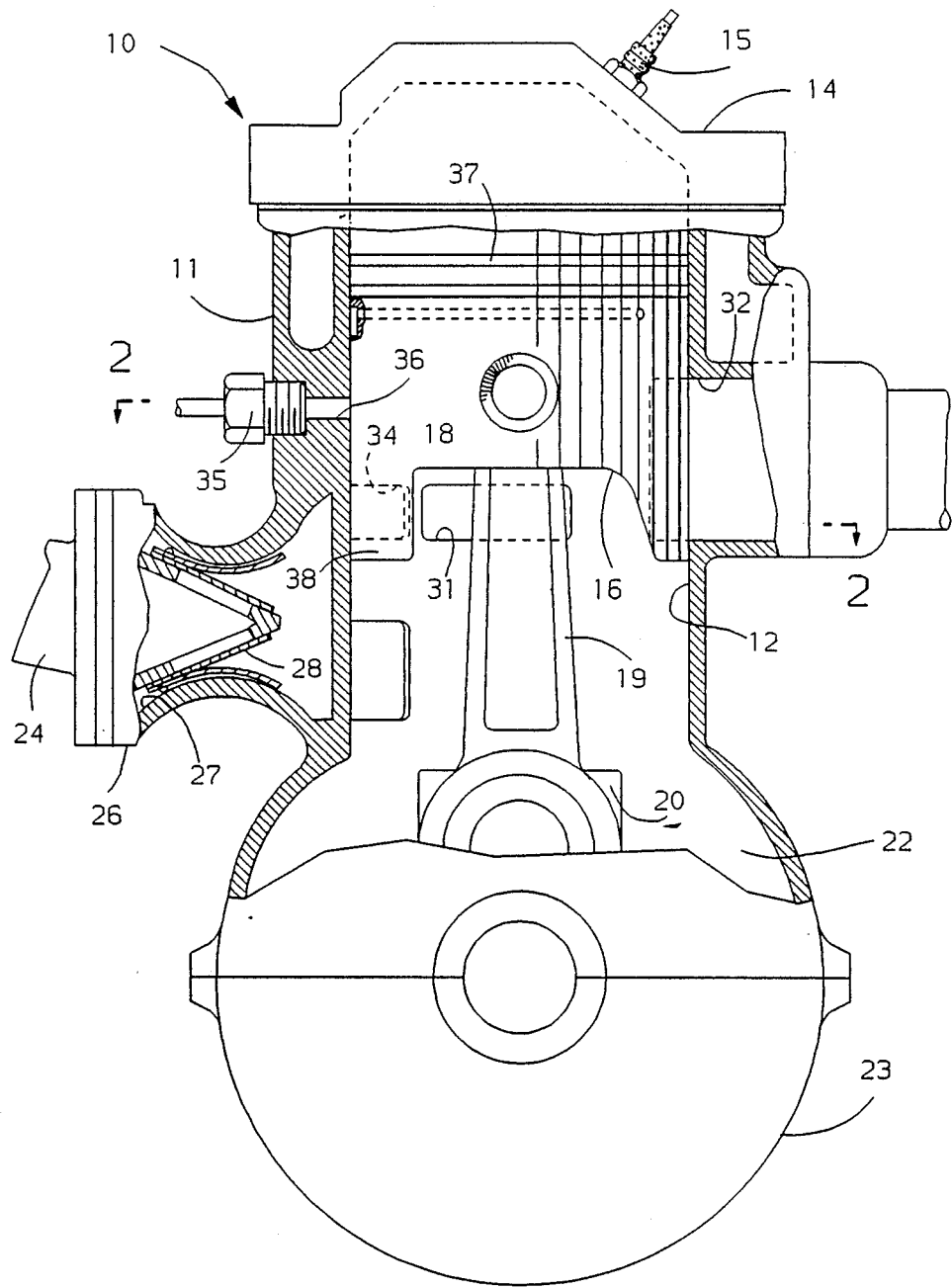
FIG. 1 is a cross-sectional view transverse to the crank and wrist pin axes of a crankcase scavenged two cycle spark ignition engine having piston skirt/cylinder wall lubrication means according to the invention.
Figure 2:
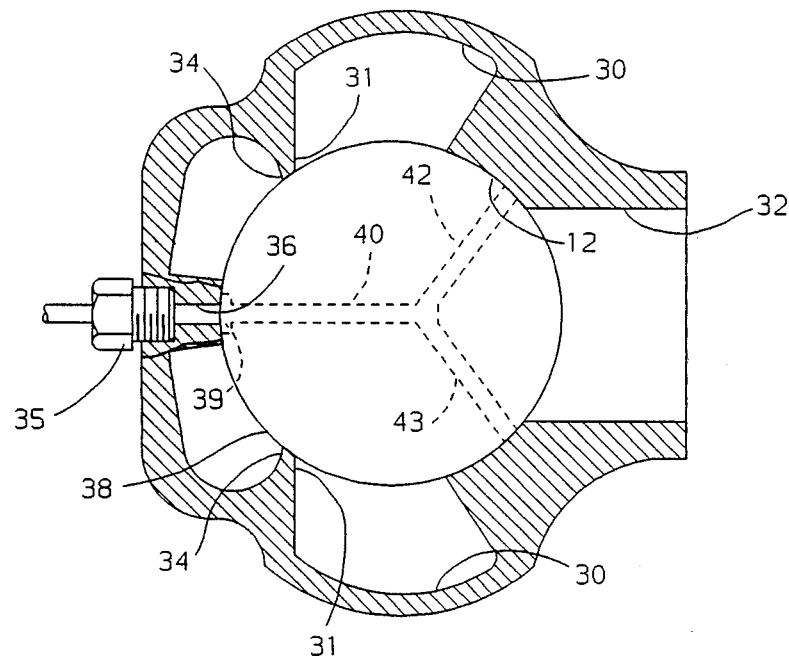
FIG. 2 is a cross-sectional view through the cylinder in the planes indicated by the line 2—2 of FIG. 1.

Referring now to FIGS. 1 and 2 of the drawings in detail, numeral 10 generally indicates a two cycle internal combustion engine of the crankcase compression type, although the features of the invention are not limited to use in such engines. Engine 10 conventionally includes a cylinder block 11 having multiple cylinders 12, only one of which is shown. A cylinder head 14 mounted on the top of the block 11 closes the outer ends of the cylinders and defines with each cylinder a combustion chamber, not shown, having an associated spark plug 15 and, optionally, a fuel injector, not shown.

In each cylinder 12 there is a reciprocable piston 16 connected by a wrist pin 18 and connecting rod 19 to one throw of a crankshaft 20 that is rotatably mounted in a crankcase chamber 22 located one below each of the cylinders. The chambers 22 are formed by the lower portion of the cylinder block 11 and a separable cover 23 attached to the block and are preferably made with small volume to provide a large value of crankcase compression in operation as is conventional in crankcase scavenged two cycle engines.

The crankcase conventionally mounts an air inlet manifold 24 on an inlet boss 26 having an inlet opening 27 for and into each crankcase chamber 22. A reed type inlet check valve 28 in each opening 27 prevents backflow of inlet air charges from the crankcase chambers to the manifold 24. A pair of transfer passages 30 extend from inlet ports 31 to connect an intermediate part of each cylinder with the crankcase and an exhaust port 32 connects the cylinder with an exhaust system. Boost ports 34 connect portions of the cylinder opposite the exhaust port with the crankcase inlet opening 27 for additional cylinder air admission.

In accordance with the invention, the walls of the piston and cylinder are lubricated by oil or oil mist delivered through a pressure fitting 35 connected with an oil or mist supply and mounted in the cylinder block at each cylinder 12. The fitting 35 feeds a small bore 36 through the cylinder wall above the boost ports that are below the lower piston ring and groove 37 opposite the piston skirt 38 when the piston 16 is in the upper portion of its travel but exposed to the cylinder 12 when the piston approaches lower dead center. Accordingly, the oil or oil mist supply to the fitting 35 must be pulsed so that it is shut off when the piston is down to avoid directing lubricant into the combustion chamber above the piston.

An axial groove 39 in the piston skirt is located to communicate with the feed bore 36 during a portion of the piston stroke. The groove 39 connects with an internal passage 40 in the piston that feeds additional internal passages 42, 43. These passages 40, 42, 43 feed oil to opposite portions of the cylinder wall generally between the exhaust and inlet ports while the bore 36 and groove 39 deliver oil against the piston skirt and cylinder wall above the boost ports 34.

The intermittant flow of oil or oil mist is delivered to appropriate portions of the cylinder and piston skirt to provide adequate cylinder lubrication while avoiding excess oil loss to the engine cylinders or exhaust system.

Figure 3:
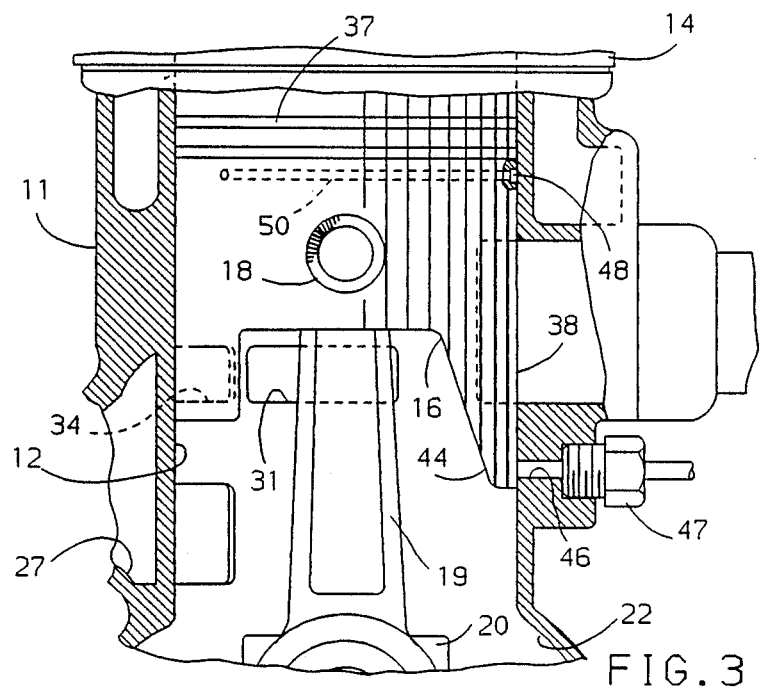
FIG. 3 is a fragmentary cross-sectional view similar to FIG. 1 but showing an alternative oil supply arrangement.

FIG. 3 discloses an embodiment similar to that of FIGS. 1 and 2 except for the arrangement of the oil distribution system. Like numerals are used for like parts.

In FIG. 3, the piston skirt has an extension 44 that covers the bore 46 fed by the fitting 47 which is relocated below the exhaust port 32. The piston groove 48 and feed passages 50 communicate with the bore 46 only near bottom dead center to feed oil to the cylinder walls and skirt. At other times, the skirt blocks the flow of lubricant from the bore 46 so that the oil system low pressure may be maintained constant and may not need to be pulsed. If desired, additional internal passages could be provided in the piston to deliver lubricant from the bore 46 to the upper portion of the cylinder when the piston is nearer the top center position. However, this would probably require non-return flow means in the piston passages to prevent oil flow into the crankcase on the downstroke.

Figure 4:
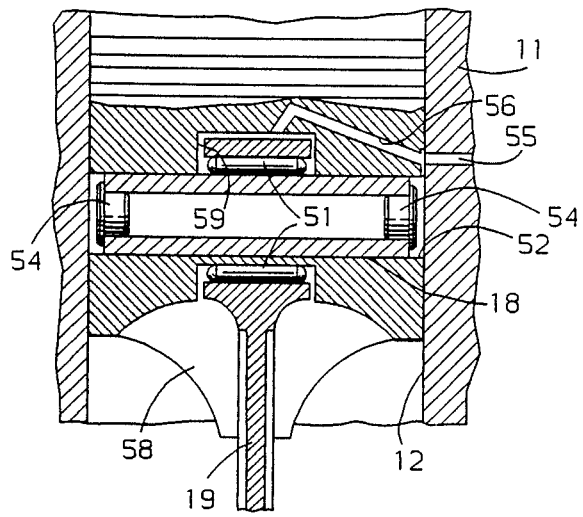
FIG. 4 is a cross-sectional view along the wrist pin axis of an engine having wrist pin and connecting rod bearing lubrication means according to the invention.
Figure 5:
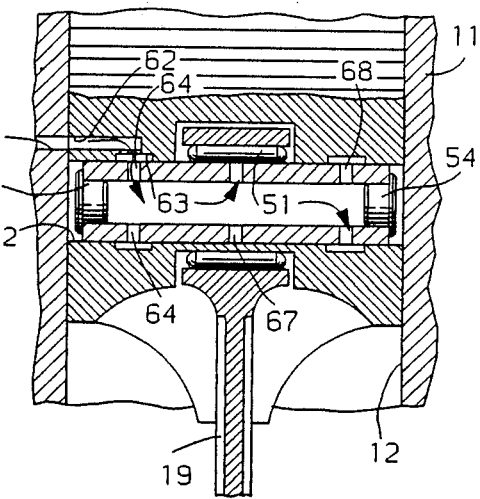
FIG. 5 and 6 are views similar to FIG. 4 but showing alternative oil supply and distribution arrangements.
Figure 6:
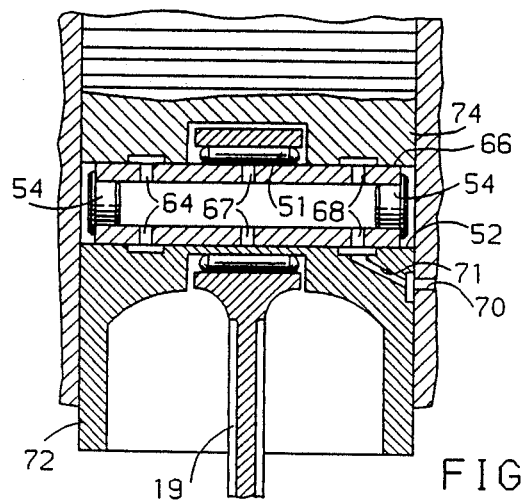

In FIGS. 4-6, additional embodiments are shown which illustrate various means for lubricating the connecting rod and piston pin. These means could be used with the piston skirt oiling features previously described or separately therefrom as desired. As in the earlier figures, like numerals identify like parts. In each of these embodiments, a needle bearing 51 connects the connecting rod 19 with the wrist pin which is directly received in a cross bore 52 in the piston, as is conventional. End plugs 54 may be provided in the wrist pin to control oil flow as well as to avoid cylinder contact with the pin.

In FIG. 4, a cylinder feed bore 55 provides pulsed oil flow intermittently to an internal passage 56 in the piston 58 which delivers the oil to a recess 59 in which the upper end of connecting rod 19 is received. The oil flows over the surfaces to lubricate the bearing 51 and wrist pin 18.

In FIG. 5, a feed bore 60 intermittently feeds an internal passage 62 that connects with an annular recess 63. Cross bores 64 in the wrist pin 66 carry the oil to the hollow interior and out through other cross bores 67, 68 to the bearing 51 and the other end of the wrist pin for lubricating the bearing surfaces.

In FIG. 6, a feed bore 70 connects intermittently with an internal passage 71 below the wrist pin 66 that similarly feeds through cross bores 64, 67, 68 to lubricate the bearing and pin surfaces. The lower skirt portion 72 of the piston 74 is extended to cover the feed bore 70 continuously so that pulsed feed of the oil supply is not needed.

The various embodiments of the invention illustrated are representative of various means which could be provided to directly lubricate the oil requiring means associated with crankcase scavenged two cycle engine pistons while minimizing the entry of oil into and carryover with the scavenging and charging air. While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An internal combustion engine having in combination a cylinder having circumferentially spaced inlet and exhaust ports and a piston reciprocable in the cylinder, the piston having a cylinder engaging skirt and wherein the improvements comprise
    oil distribution means in and opening to the interior of the cylinder at a location circumferentially intermediate said ports for delivering lubricant to the cylinder interior, and
    oil passage means in the piston and opening through the skirt of the piston in circumferential alignment with said oil distribution means for receiving lubricant therefrom during communication therewith and said passage means directly communicating with lubrication requiring means associated with the piston.

2. A piston as in claim 1 wherein said passage means opens through the skirt at another location for delivering lubricant to the skirt surface for lubricating reciprocating motion thereof within said cylinder.

3. A piston as in claim 1 wherein said passage means communicates with a bearing within the piston for lubricating the bearing under loaded conditions and during relative oscillating motion between the piston and an associated connecting rod.

4. A piston as in claim 3 wherein the bearing comprises a needle bearing acting between the associated connecting rod and a piston carried wrist pin.

* * * * *